6 Sheets—Sheet 1.

D. GEISER.
Thrashing Machine.

No. 234,708. Patented Nov. 23, 1880.

Attest,
W. H. H. Knight
A. M. Long

Daniel Geiser.
Inventor.
By H. T. Abbot
Atty.

D. GEISER.
Thrashing Machine.
No. 234,708. Patented Nov. 23, 1880.
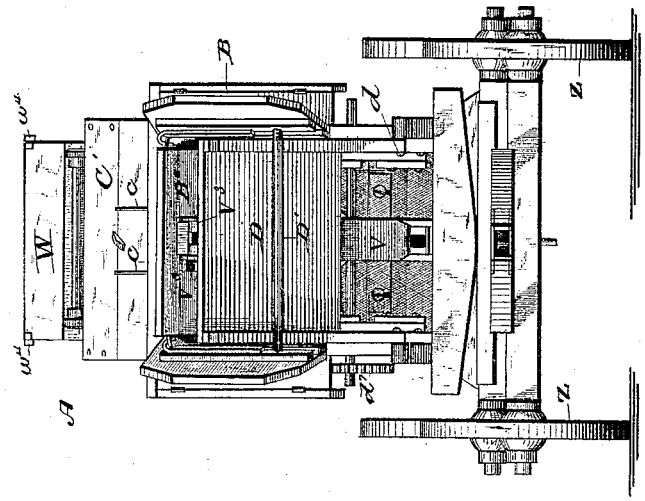
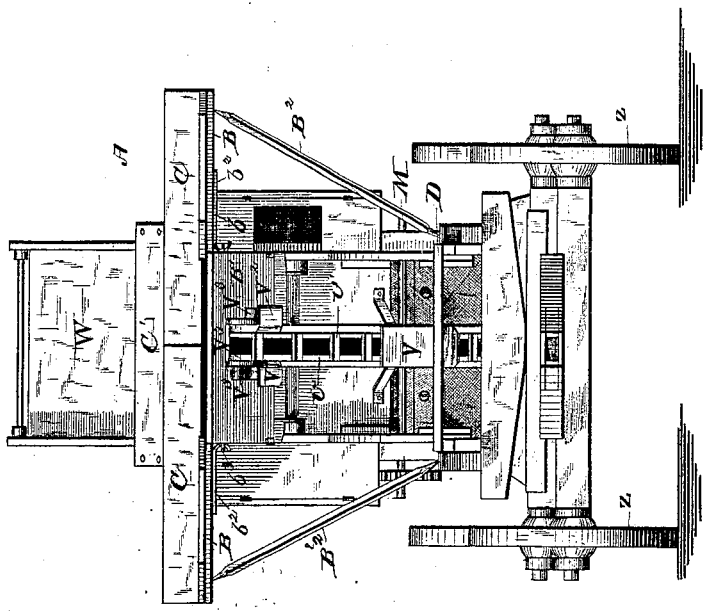
Attest,
W. H. H. Knight,
A. M. Long.
Daniel Geiser,
Inventor.
By H. T. Abbot,
Atty.

6 Sheets—Sheet 3.

D. GEISER.
Thrashing Machine.

No. 234,708. Patented Nov. 23, 1880.

Attest.
A. M. Long
Wm. C. Anderson

Daniel Geiser,
Inventor.
By H. J. Abbot
Atty.

N. PETERS, PHOTO-LITHOGRAPHER, WASHINGTON, D. C.

6 Sheets—Sheet 5.

D. GEISER.
Thrashing Machine.

No. 234,708.                    Patented Nov. 23, 1880.

Attest,
W. H. H. Knights
A. M. Long

Daniel Geiser.
Inventor,
By H. J. Abbot.
Atty

6 Sheets—Sheet 6.

D. GEISER.
Thrashing Machine.

No. 234,708.  Patented Nov. 23, 1880.

Attest,
W. H. H. Knight
A. M. Long.

Daniel Geiser,
Inventor,
By H. T. Abbot,
Atty.

N. PETERS, PHOTO-LITHOGRAPHER, WASHINGTON, D. C.

United States Patent Office.

DANIEL GEISER, OF WAYNESBOROUGH, PENNSYLVANIA.

THRASHING-MACHINE.

SPECIFICATION forming part of Letters Patent No. 234,708, dated November 23, 1880.

Application filed August 14, 1879.

*To all whom it may concern:*

Be it known that I, DANIEL GEISER, of Waynesborough, in the county of Franklin and State of Pennsylvania, have invented certain new and useful Improvements in Thrashing-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
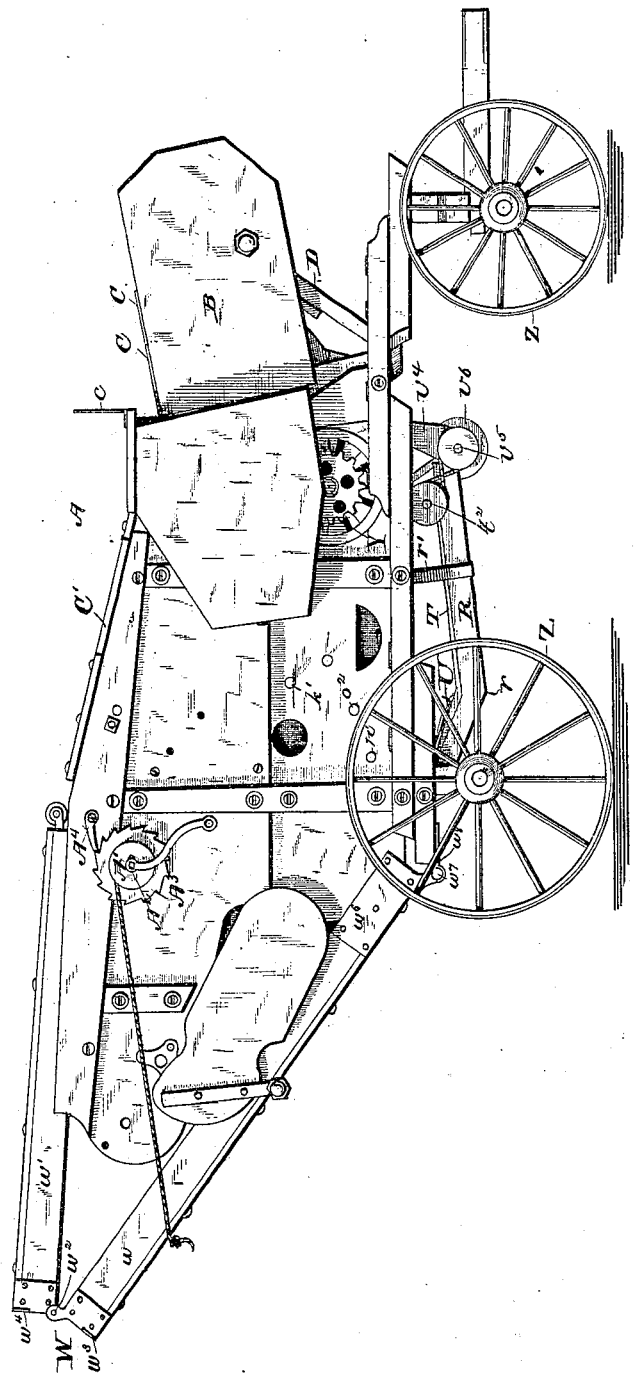
Figure 4:
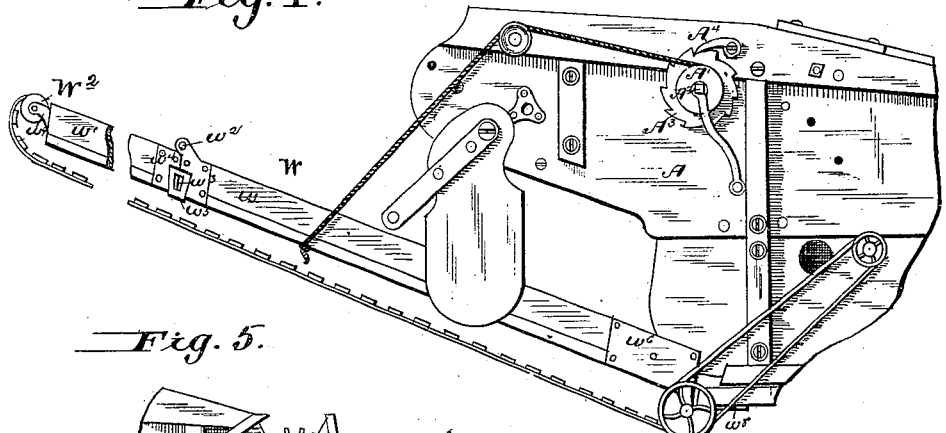
Figure 5:
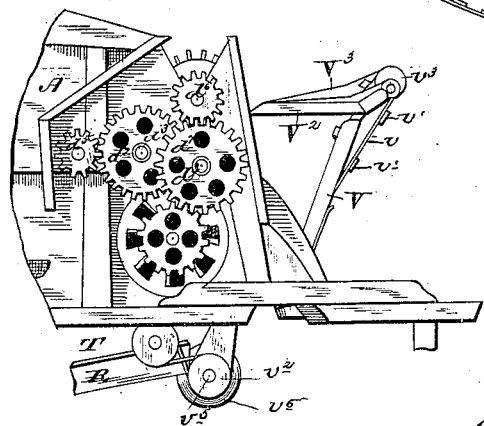
Figure 6:
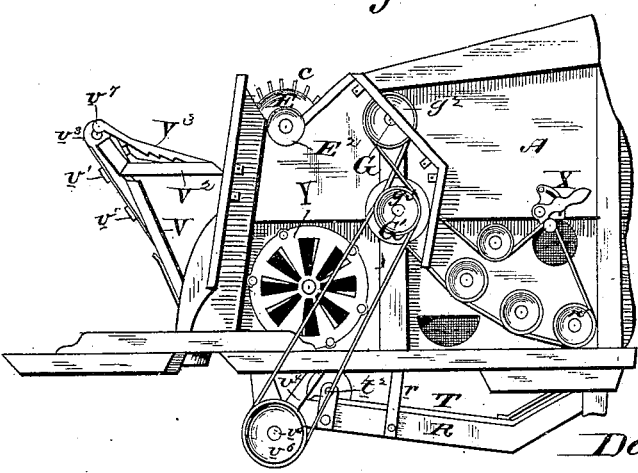
Figure 7:
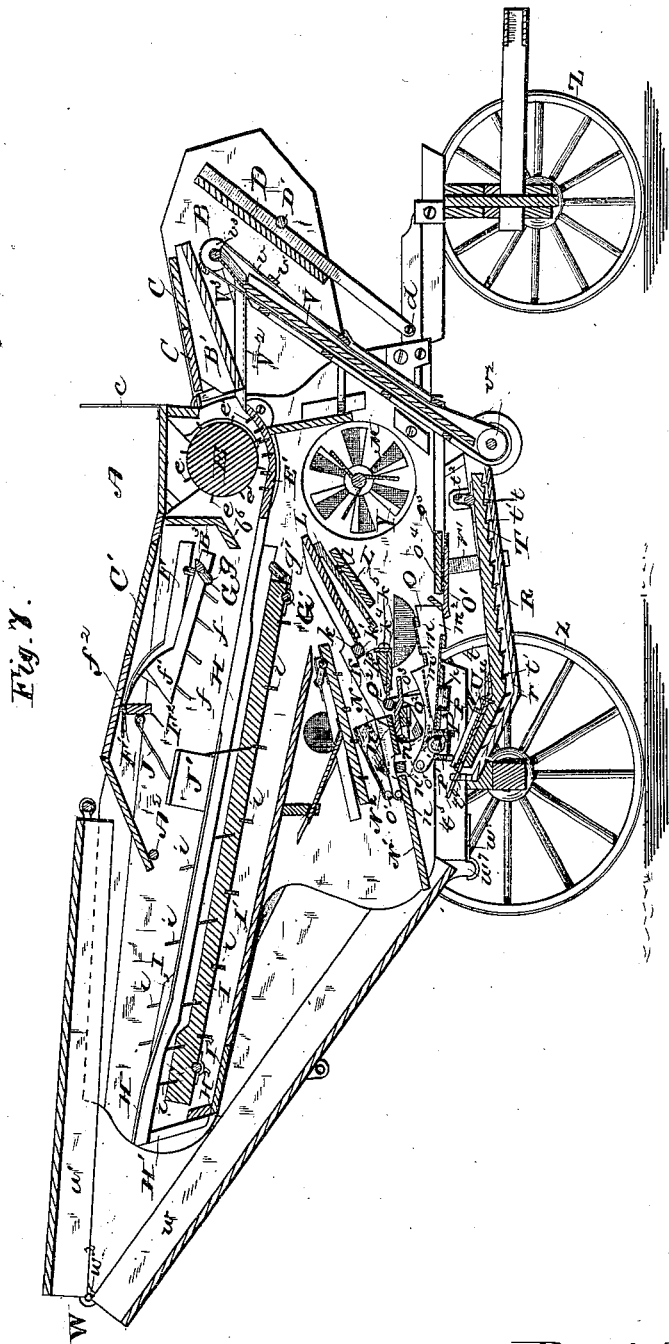
Figure 8:
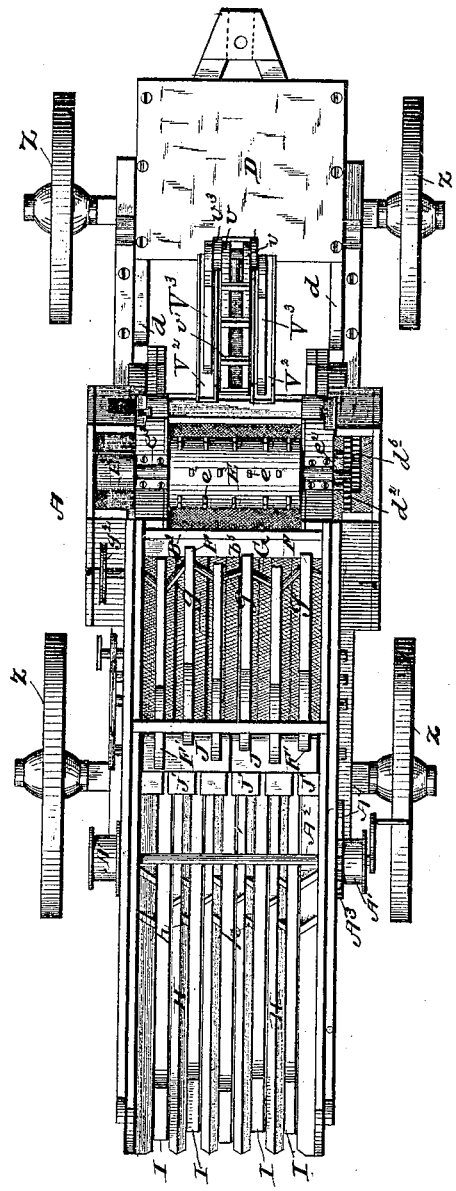
Figure 9:
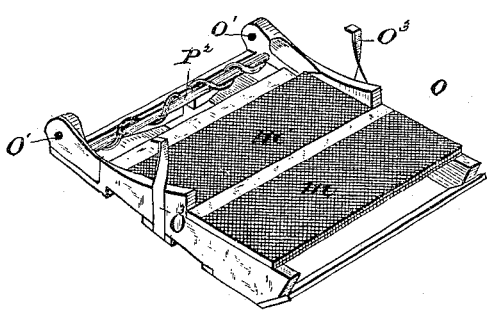
Figure 10:
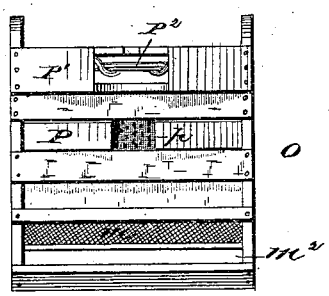
Figure 11:
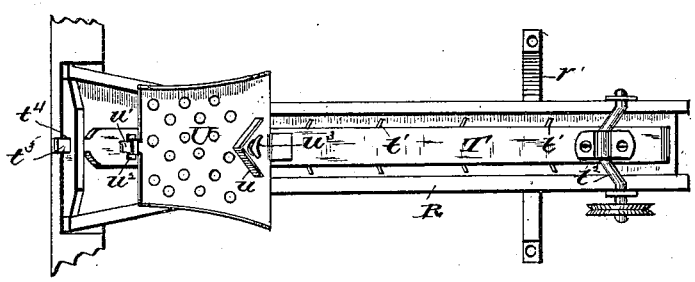
Figure 12:
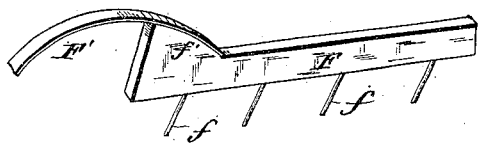

Figure 1 is a side view of my improved thrashing-machine with sheaf-tables and stacker attached and closed for transportation. Fig. 2 is a front elevation of the same. Fig. 3 is a front elevation with sheaf-tables and stacker open for operation. Fig. 4 is a view of a portion of one side, showing stacker attached and open. Fig. 5 is a view showing a portion of one side, with gear for operating the fan, rakes, and separator-shoes. Fig. 6 is a view of the opposite side, and shows the pulleys for operating the riddles. Fig. 7 is a vertical longitudinal section through the center of the machine. Fig. 8 is a top-plan view, with cover and stacker removed to show the interior of the machine. Fig. 9 is a perspective view of the lower separator-shoe with riddles attached, and shows the right and left hand screw for collecting and passing the tailings to the elevator. Fig. 10 is a bottom-plan view of the same. Fig. 11 is a top-plan view of the conveyer and reciprocating rake for conveying the tailings to the elevator. Fig. 12 is a perspective view of one of the upper reciprocating rakes with angle-block and guide-arm attached.

The object of my invention is to provide a thrashing-machine wherein the grain is more quickly, easily, and thoroughly separated from the straw and discharged from the machine in a purer and cleaner condition than from any machine heretofore in use.

A represents a cylinder thrashing-machine, supplied at its rear end with a stacker, W, and at its front end with two sheaf-tables, B B, hinged at $b$ $b'$ to the inclined feeding-chute B'. The tables B are made removable, being hinged to the chute in the following manner: The forward hinge, $b$, consists of a hooked plate, $b^2$, which engages with a staple, $b^3$, on the side of the chute B', while the rear hinge consists of a plate, $b^4$, having a socket at its outer end, which socket slips upon a pin, $b^5$, on the front of the machine.

When in operation the tables B B are raised and held in a horizontal position by props $B^2$, which rest upon the frame of the machine, as shown in Fig. 3. When the tables are so raised two removable shields, C C', are placed in a vertical position on the cover of the machine, at the rear of tables B, and are held in position by staples or eyelets on the shields, which staples slip on two small standards, $c$ $c$, affixed for that purpose to the cover C' of the machine. The sheaf-tables, in conjunction with the shields, hold the gavels of grain, and thereby facilitate the operation of feeding the thrashing-machine.

When the machine is not in use, or is being transported from place to place, the tables B are folded down against the side of the chute. When so lowered the platform D, being pivoted at $d$, is swung upward and held between the tables B B by a rod, D', which passes through the tables in front of or below the platform, which rod has terminal screws and nuts, whereby the tables and platform are firmly secured together, thereby forming a substantial shield and shelter for the elevator. When the sheaf-tables are so secured the shields C are removed from the standards $c$ and are laid upon the top of the chute B', between the tables B B, as shown in Fig. 1.

The cover C' of the machine is made in sections, as shown, for the purpose of giving access to the interior of the machine.

E represents the cylinder, having the usual teeth $e$. E' is the thrashing-concave, also supplied with the usual teeth $e'$. The shaft $e^2$ of the cylinder has its bearings at $e^3$ $e^3$, and carries a pulley, $E^2$, through which pulley motion is imparted to the entire machine.

Placed in the rear of the cylinder, and in front of and under the upper reciprocating rakes, is a guard-board, $B^3$, the lower portion of which, $b^6$, extends under the crank-shaft G, and serves to prevent the straw from wrapping around the journals of said shaft or becoming entangled in the crank $g$, and thereby breaking or otherwise damaging the machine.

F F represent the upper reciprocating rakes, furnished upon their under sides with teeth $ff$. Upon the upper side of the rakes F F, and at the rear ends thereof, are angular blocks $f'$, which angular blocks may be formed with or made separate from and secured to the rake in any suitable manner.

To the angular blocks $f'$ are attached by suitable means curved guide arms or irons $F'$, which, when the rakes are moved to and fro, slide in slots $f^2$ in a transverse bar, $F^2$, provided in the upper part of the machine for that purpose.

The rakes F F are actuated by cranks $g\ g$ on a crank-shaft, G, journaled in the sides of the machine. One end of shaft G carries a pulley, $g^2$, which pulley is belted to and rotated by a similar pulley, $g^3$, on the lower crank-shaft, $G'$.

The opposite end of shaft $G'$ is provided with a pinion, $d'$, which meshes in a spur-wheel, $d^2$. The latter is loosely mounted on a stud, $d^3$, on the side of the machine, and is driven by a pinion on the side of a second spur-wheel, $d^4$, loosely mounted on a stud, $d^5$, and rotated by a pinion, $d^6$, on the cylinder-shaft. The spur-wheel $d^4$ also meshes into and rotates a pinion, $d^7$, on the fan-shaft.

It will thus be seen that when the cylinder-shaft is rotated it will, through the connecting-gear and pulleys above described, rotate the crank-shafts G G′ of the rakes F and I and the fan respectively.

It will also be seen that, in consequence of the crank $g$ and of the guide-arms $F'$ of the rakes F moving in the slot $f^2$, the rake when moved to and fro will have an up-and-down motion throughout its entire length, which motion insures a better separation of the grain from the straw and allows the latter greater space while passing under the rakes.

The cranks $g$ are set at different angles with the shaft G, by which construction two or more of the rakes F will move at the same time in opposite directions.

Beneath the rakes F, and extending from the thrashing-concave to the rear of the machine, are a series of bars, H, the forward ends of which are attached to the thrashing-concave, while the rear ends are supported by standards $H'$ secured to a transverse bar, $H^2$, at the rear of the machine. The bars H form a bed on which the straw moves in its passage from the machine, and they further serve to protect the lower series of rakes, I, and to prevent the straw from becoming entangled in the teeth $i$ of the same.

The rakes I have a series of teeth, L, on their under sides, and are actuated by cranks $g^4$ on the shaft $G'$. At the rear ends of I are similar cranks, $g^5$, on a shaft, $G^2$, the two series of cranks serving to give the rakes an up-and-down motion while in operation, the cranks being set in opposite directions for the same reason as those of rakes F.

The upper sides of the bars H are slightly beveled downward from their centers, and are provided with a series of notches or cleats, $h$, to catch and hold the loose grain shaken from the straw in its passage over them. Suitable space is allowed between the bars H and rakes I for the grain to fall through to a closed bottom, $I'$, on which it is conveyed by the rake-teeth $i$ to the riddles.

A flap, $I^2$, is provided in the bottom $I'$, by which access is gained to the space under rakes I.

Immediately in rear of the rakes F, and pivoted to the transverse bar $F^2$, is an apron or series of aprons, J, the lower edges of which rest upon blocks $J'$ on the bars H. The function of these aprons is to prevent the grain from being thrown too far back by the action of the cylinder.

K represents the upper separator-shoe, pivoted at its lower end to the side of the machine, which shoe is agitated by square shoulders $k$ on a shaft, $k'$, and is limited and controlled in its movements by a lever, L, pivoted at $l$ to a wind-board or deflector, $L'$, in rear of fan M. This lever, as well as the levers $O^2$ and $O'$, hereinafter described, has an oscillating movement on its pivot or fulcrum and operates automatically, for as one end of the shoe is more or less depressed by the weight of the grain upon it, it bears with more or less weight on the elevated end of the lever, and by lowering that end of it elevates the weighted end. The lever cannot be depressed below the wind-board, on which it is fulcrumed, and between that point and the limit of its upward movement it rises and falls gradually as the weight on the shoe is increased or diminished.

The separator-shoe K is provided at $K^3$ with an adjustable board, $k^4$, by which board the blast from the fan is regulated. $k^5$ are the set-screws for adjusting the board $k^4$.

N is an agitator pivoted to the sides of the machine at $n$, and forming an extension of the separator-shoe K, the agitator N receiving the chaff and passing it to a guide-board, $N'$, by which it is passed from the machine.

The agitator N is operated by square shoulders on a shaft, $n'$, and limited in its movements by a lever, $O^2$, pivoted at $n^3$ to a bar, $n^4$, of the separator-shoe K.

$N^2$ represent shields placed over the arms or frame of N, to prevent the latter from being clogged by the chaff.

O is the lower separator-shoe, pivoted at $o'$ to the sides of the machine and agitated by square shoulders on a shaft, $o^2$, to which it is connected by arms $o^3\ o^3$. The shoe is limited and controlled in its movements by a lever, $O'$, pivoted at $o^4$ to a bar, $o^5$, extending across the bottom of the machine.

The shoe O is provided with two riddles, $m\ m'$, the forward one of which, $m$, is placed above an opening, $m^2$, in the bottom of the shoe. Upon the bottom of the shoe, and extending from side to side thereof, are two troughs, P P′, each having a downward inclination from the ends toward their centers, at which point suitable openings are made, whereby they may be discharged.

The forward and smaller trough, P, is placed below the riddle $m'$, and is covered by a perforated metal plate or sieve, $p$, which plate or sieve allows the grain to fall through into the trough P, from which trough suitable spouts conduct it to bags or other receptacles, while the tailings are moved by the action of the separator to the rear trough, P′, in which works a right-and-left-hand screw, P², having its bearings in the sides of the separator-shoe and rotated in any suitable manner—as, for example, by belt and pulleys from the shaft $o^2$.

The shafts $n'$, $k'$, and $o^2$ are corrugated throughout their lengths, into which fit similar corrugations or teeth or metal plates attached to the separator-shoe K and agitator N, respectively, the object of the corrugations being to exclude chaff.

Below the separator-shoe O, and extending from the rear axle to the elevator V, is a conveyer, R, the rear portion of which is wider than the forward portion and slopes upward from a point, $r$. The rear end of the conveyer is secured to the rear axle, while its forward portion is held in place by a support, $r'$, from the bar $o^5$. Within the conveyer R is a reciprocating rake, T, the under side of which is formed into a series of notches, $t$, and is further supplied with teeth $t'$ for carrying the tailings forward to the elevator. The forward end of the rake T is attached to a crank-shaft, $t^2$, by which it is operated. The rake is further controlled in its movements by a guide-arm, $t^3$, attached to its rear end and working in a slot, $t^4$, in the rear end of the conveyer.

Secured upon the rear inclined end of the rake T is a separator-pan, U, the bottom of which is perforated to allow the tailings to fall through to the conveyer, while the chaff is guided by a fence, $u$, from the forward part of the pan to the ground. The pan U is secured to the rake T by a tongue, $u'$, and staple $u^2$, and at its forward end by a thumb-screw, $u^3$.

V is the elevator, supplied with the usual belts $v$ and buckets or cleats $v'$ and operated by drums $v^2 v^3$ at top and bottom. Extending from the lower drum, $v^2$, to a support, $v^4$, is a shaft, $v^5$, which shaft is rotated by a pulley, $v^6$, and belts to the crank-shaft G′.

The crank-shaft $t^2$ is rotated by pulley and belts from the shaft $v^5$. Extending from the top of the elevator to the thrashing-concave are two small troughs or conveyers, V², into which the tailings are discharged from the elevator, and which, by the action of the two small reciprocating rakes V³ working therein, convey said tailings to the cylinder for re-thrashing. The upper drum, $v^3$, is supplied at each end with crank-pins $v^7$, which operate the rakes V³.

W represents the stacker, preferably made in two sections, $w$ $w'$, and hinged together at $w^2$, each section having a projecting point, $w^3$ $w^4$, upon which projections, when the stacker is open, a clamp, $w^5$, is placed, thereby firmly securing the sections together. Secured to the lower end of section $w$, and upon each side thereof, are plates $w^6$, the lower ends of which are elongated, and have hollow studs or trunnions $w^7$ secured thereto, which studs or trunnions $w^7$ rest in a box, $w^8$, attached to the rear under side of the machine, as shown in Fig. 4. The upper shaft, W², has its bearings in the sides of the stacker, or in plates $w^9$ secured thereto.

The stacker is raised and lowered by ropes extending to drums A′ on the ends of a shaft, A², in the upper part of the machine, and is held in any desired position by a ratchet, A³, on one or both of the drums and pawls A⁴ on the sides of the machine.

X represents a belt-tightener, Y air-ports for fan M, and Z the wheels of the machine.

Having described my invention, what I claim as new, and desire to secure by Letters Patent, is—

1. In a thrashing-machine, the reciprocating rakes F, having angle-blocks $f'$ and guide arms or wires F′, substantially as described.

2. The combination of the reciprocating rakes F, having angle-blocks $f'$ and guide arms or irons F′, with cranks $g$ on shaft G and slots $f^2$ in transverse bar F², substantially as described, and for the purpose specified.

3. In a cylinder thrashing-machine, the dividing-apron or series of aprons J between the two sets of rakes, substantially as described.

4. In a cylinder thrashing-machine, the dividing-apron or a series of dividing-aprons, J, pivoted to the transverse bar F², in combination with the reciprocating rakes F and I and the bars H interposed between said rakes, substantially as and for the purpose set forth.

5. In a cylinder thrashing-machine, the bars H, placed above the lower series of rakes, I, and having their upper sides slightly beveled downward, and provided with a series of notches or small cleats, $b$, as and for the purposes set forth.

6. In a cylinder thrashing-machine, the levers L and O² under the separator-shoe K, and agitator N, operating automatically, as described, to regulate and control the movement of said separator-shoe, substantially as described.

7. The combination of the separator-shoe O with the automatic controlling-lever O′, substantially as described.

8. The reciprocating rake T, in combination with a separator-pan, U, supported on said rake, and provided at its forward end with a fence, $u$, and conveyer R, substantially as and for the purpose set forth.

9. The reciprocating rake T, having notches $t$ and teeth $t'$ set in and projecting from said notches, as shown and described.

In testimony that I claim the foregoing I have hereunto set my hand.

DANIEL GEISER.

Witnesses:
 E. ELDEN,
 I. N. SNIVELY.